(12) United States Patent
Gajo et al.

(10) Patent No.: US 7,890,666 B2
(45) Date of Patent: Feb. 15, 2011

(54) EMBEDDED PROTOCOL SELECTION TECHNIQUE, RELATED INTERFACE AND COMPUTER PROGRAM PRODUCT

(75) Inventors: Flavio Gajo, Milan (IT); Francesco Sforza, Milan (IT); Stefania Stucchi, Cornate D'Adda (IT); Loris Giuseppe Navoni, Cernusco sul Naviglio (IT); Michele Borgatti, Finale Emilia (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 1201 days.

(21) Appl. No.: 11/420,422

(22) Filed: May 25, 2006

(65) Prior Publication Data

US 2007/0073893 A1 Mar. 29, 2007

(30) Foreign Application Priority Data

May 27, 2005 (EP) .................................. 05011526

(51) Int. Cl.
*G06F 3/00* (2006.01)
*G06F 13/12* (2006.01)

(52) U.S. Cl. ........................... 710/11; 710/62; 719/321; 719/327

(58) Field of Classification Search ........................ None
See application file for complete search history.

(56) References Cited

U.S. PATENT DOCUMENTS 5,420,412 A   5/1995   Kowalski
5,581,708 A   12/1996  Iijima
6,088,755 A   7/2000   Kobayashi et al.
6,581,122 B1  6/2003   Sarat
6,973,658 B2* 12/2005  Nguyen ...................... 719/327
2004/0035939 A1* 2/2004  Lin ............................. 235/487
2004/0070952 A1  4/2004  Higuchi et al.

FOREIGN PATENT DOCUMENTS

EP   1 503 559 A1   2/2005

OTHER PUBLICATIONS

European Search Report No. EP 05 01 1526.

* cited by examiner

*Primary Examiner*—Alan Chen
(74) *Attorney, Agent, or Firm*—William J. Kubida; Peter J. Meza; Hogan Lovells US LLP

(57) ABSTRACT

A protocol-based communication between a host device (e.g., MP3 player, digital camera, palmtop, etc.) and an interface (e.g., flash mass storage card) is established automatically by providing protocol-supporting facilities in the interface, each facility supporting communication with the host device based on a respective protocol, by sending a query message from the host device to the interface specifying at least one protocol for use in protocol-based communication, by searching, within the plurality of protocol-supporting facilities provided in the interface one protocol-supporting facility supporting the protocol proposed in the query message, and if such protocol-supporting facility is found within the plurality of protocol-supporting facilities provided in the interface, by setting up the protocol-based communication between the host device and the interface based on the protocol proposed in the query message issued from the host device.

14 Claims, 3 Drawing Sheets

Fig_4
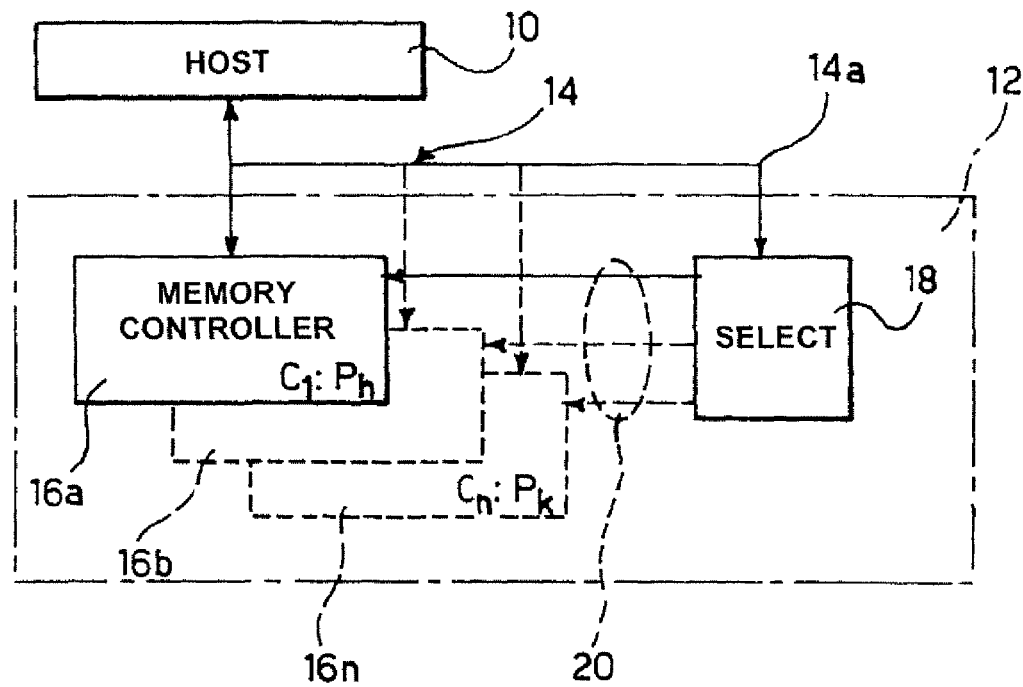
Fig_5
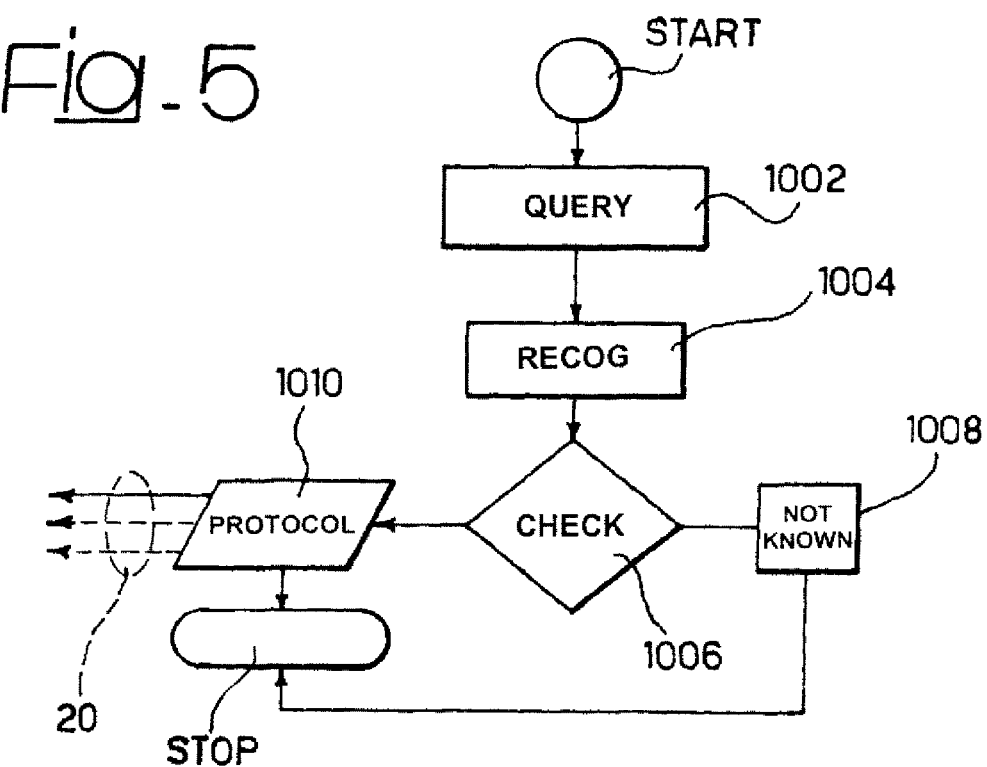

EMBEDDED PROTOCOL SELECTION TECHNIQUE, RELATED INTERFACE AND COMPUTER PROGRAM PRODUCT

RELATED APPLICATION

The present application claims priority of European Patent Application No. 05011526.00 filed May 27, 2005, which is incorporated herein in its entirety, by this reference.

FIELD OF THE INVENTION

The present invention relates to protocol selection techniques. More particularly, the present invention relates to possible application in producing interfaces such as mass storage cards.

DESCRIPTION OF THE RELATED ART

Present-day host devices such as MP3 players, digital cameras, palmtops, etc. may use different communication protocols, such as MultiMediaCard (MMC) and SecureDigit (SD) to communicate e.g. with flash mass storage cards.

Some host devices can support multiple protocols so that they can use different memories. An intrinsic problem plaguing these solutions lies in the great number of existing communication standards. In practical terms a number of existing solutions (especially at the card level) use only one protocol.

Certain host devices are in a position to operate with a restricted set of protocols, such as SDIO (Secure Digital Input/Output), SD or MMC.

Although a few hosts can support many protocols, old hosts do not support new cards, and no commercial memory cards are known which support multiple protocols.

SUMMARY OF THE INVENTION

In view of the foregoing, the need is felt for arrangements that may dispense with the drawbacks and impracticalities of the prior art arrangements discussed in the foregoing. An object of the invention is thus to provide an improved solution fulfilling such a need.

According to the present invention, a protocol-based communication between a host device (e.g., MP3 player, digital camera, palmtop, etc.) and an interface (e.g., flash mass storage card) is established automatically by providing a plurality of protocol-supporting facilities in the interface, each facility supporting communication with the host device based on a respective protocol, by sending a query message from the host device to the interface specifying at least one protocol for use in protocol-based communication, by searching, within the plurality of protocol-supporting facilities provided in the interface one protocol-supporting facility supporting the protocol proposed in the query message, and if such protocol-supporting facility is found within the plurality of protocol-supporting facilities provided in the interface, by setting up the protocol-based communication between the host device and the interface based on the protocol proposed in the query message issued from the host device.

The invention also relates to a corresponding interface as well as a related computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention Reference to "at least one computer" is intended to highlight the possibility for the present invention to be implemented in a distributed/modular fashion.

In a preferred embodiment of the invention protocol-based communication between a host device and an interface, such as a memory card, is automatically set-up by providing, in said interface, a plurality of protocol-supporting facilities, such as memory controllers, each said facility adapted for supporting communication with said host device based on a respective protocol, sending from said host device towards said interface a message specifying at least one protocol for use in said protocol-based communication, searching, within said plurality of protocol-supporting facilities one protocol-supporting facility supporting said at least one protocol proposed in said message, and if such protocol-supporting facility is found in said plurality of protocol-supproting facilities, setting up said interface for protocol-based communication with said host based on said at least one protocol proposed in said query message.

The arrangement described herein may be exploited to give rise, for example, to a multi-protocol automatic card setup, namely an operating arrangement wherein—depending on the host device—card set up can take place according to a selected required protocol (e.g. SDIO, SD or MMC).

A single card type is thus adapted to operate with several different protocols, which represents a major advantage on the consumer side. On the manufacturer side, such an arrangement may be exploited to develop a single project for several protocols, This while ensuring compatibility with old hosts, which represents an additional advantage on the consumer side.

A preferred embodiment of the arrangement described herein is an interface with two distinctive traits:
  it supports multiple protocols, and
  it senses the protocol preferred by the host. This latter point applies even in the case where more than one protocol is supported, so that—according to standard specifications—the host first tries the protocol it prefers best, in order to configure the interface accordingly.

Although different implementations are feasible, a particularly preferred embodiment of the invention is based on a specific subsystem that detects the first communication sent by the host that, according to the specifications, queries the card using its preferred protocol, recognizes the protocol, configures the card so as to let the card reply to the host using the right protocol and de-activates itself.

The process described above is completely transparent to the host. The specific embodiment described in the foregoing is adapted to be mapped e.g. to reconfigurable hardware platforms such as Celaro (a HW emulator by Mentor Graphics) and MP4CF (a FPGA-based fast-prototyping platform by Aptix Corp.).

Similarly, the arrangement described is completely transparent to the types of protocols considered. Consequently, while protocols such as SDIO, SD or MMC have been mentioned in the foregoing as exemplary of protocols adapted to best benefit from the arrangement described herein, the scope of the invention is in no way limited to the adoption/choice of these specific protocols.

BRIEF DESCRIPTION OF THE DRAWINGS

The invention will now be described, by way of example only, by referring to the enclosed figures of drawing, wherein:

FIGS. 4 and 5 are a functional block diagram and a flow chart, respectively, providing further detail of the structure and operation of the arrangement of the present invention.

DETAILED DESCRIPTION OF PREFERRED EMBODIMENTS

Figure 1:
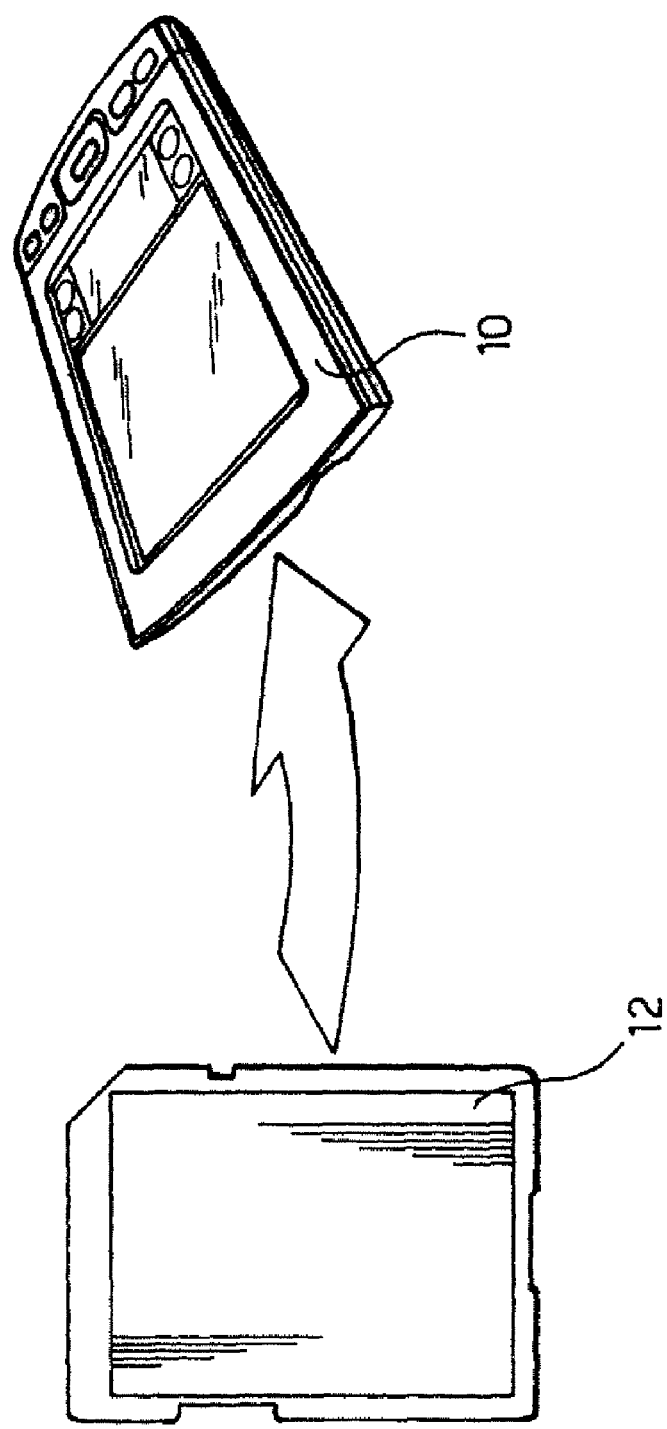
FIG. 1 is a schematic representation of the typical scenario of use of the present invention.

The arrangement described herein is intended to operate within the scenario schematically represented in FIG. 1, namely a host device 10 (of any known type, e.g. an MP3 player, a digital camera, a palmtop, and so on), and another device 12 intended to co-operate with the host device 10. Exemplary of the device 12, also referred to herein as an "interface", is a storage card such as a flash mass storage card. As is well known these cards are essentially in the form of "smart" cards that support a certain amount of data processing circuitry adapted to perform the processing tasks that are described in greater detail in the rest of this description.

In the following, it is generally assumed that the host device 10 is a position to support many different protocols for communication with different interfaces 12. For the sake of simplicity, it is generally assumed that interaction between the host device 10 and the interface (i.e. the card 12) takes place by using a single protocol selected as better detailed in the following. Extension of the arrangement described herein to arrangements wherein the host device 10 and the interface 12 can interact by using one of a plurality of different protocols is however within the scope of the present invention.

Figure 2:
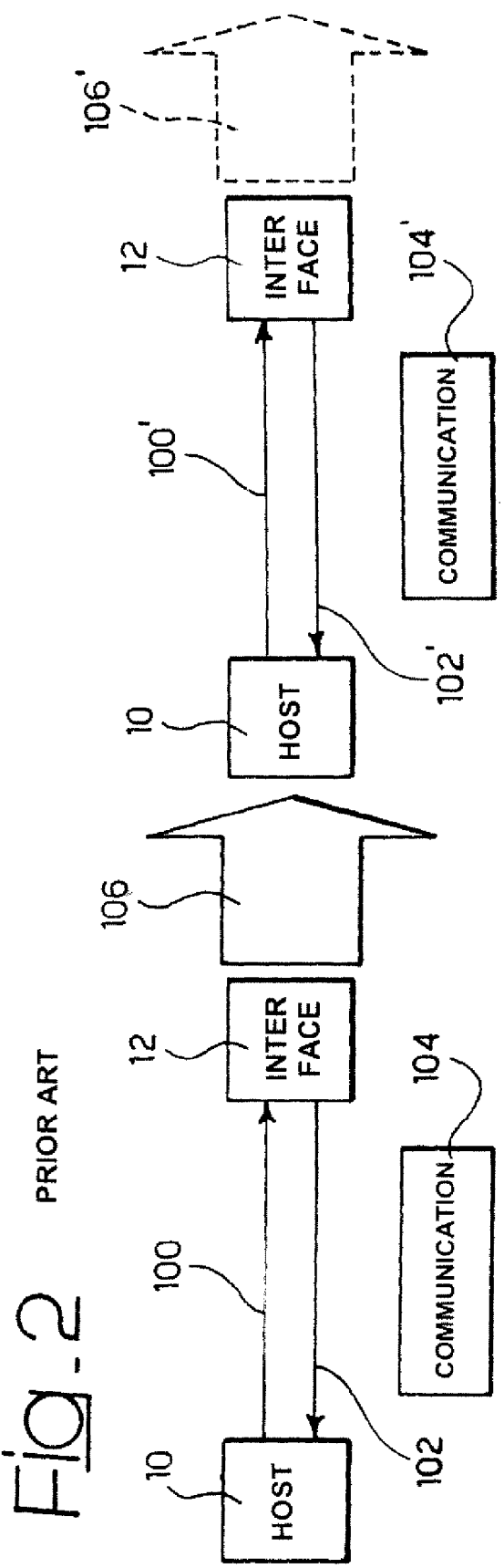
FIG. 2 is a functional diagram representative of operation of a prior-art arrangement.

The functional diagram of FIG. 2 is exemplary of the pattern of operation of a prior art arrangement wherein a host device 10 attempts to co-operate with an interface 12 (hereinafter, reference is made throughout to a storage card for the sake of simplicity).

The leftmost portion of FIG. 2 shows the host 10 sending towards the card 12 a query message 100 in the form of command of a given protocol (for instance SDIO) In the case the card 12 does not support such a protocol, no response is provided, as schematically indicated at 102, towards the host 10.

The attempt to establish communication thus fails, and at that point, the host 10 may attempt, as schematically shown in 106, to establish communication using a new protocol (for instance MMC).

In the case the card 12 does not support MMC, the same steps considered in the foregoing are repeated, namely.

a (MMC) query command 100' is sent from the host 10 towards the card 12;

no response is provided from the card 12 towards the host 10, as schematically indicated at 102'; and the attempt of establishing communication fails again as indicated at 104'.

At this point host 10 can make a further attempt (as schematically shown at 106') to establish communication with the card 12 by using still another protocol. The sequence just described may continue through all the set of protocols supported by the host device 10 and ends when the query message sent from the host 10 is in compliance with the protocol supported by the card 12. Alternatively, if no matching protocol is found to be supported by the card 12, the attempt to establish communication and interaction is finally aborted.

Figure 3:
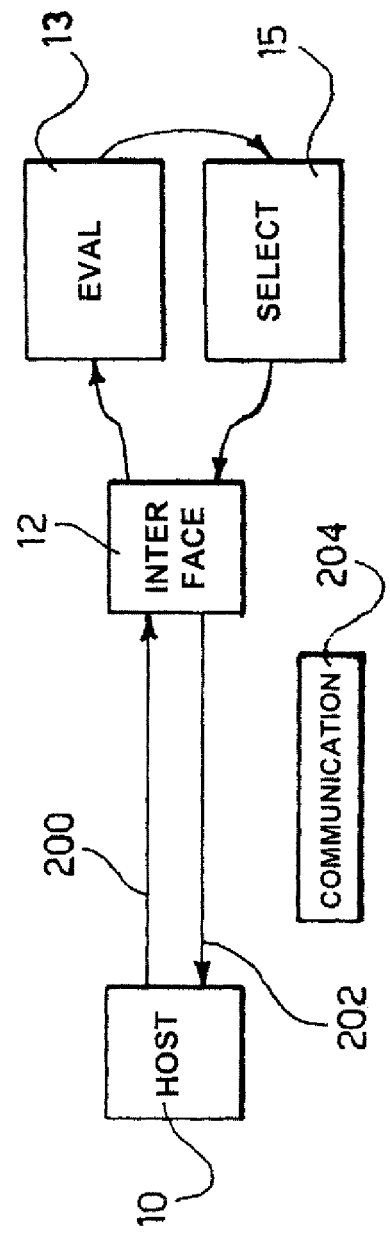
FIG. 3 is a functional diagram representing, by way of direct comparison to FIG. 2, operation of the arrangement of the present invention.

FIG. 3 is representative of how the same process is successfully handled within the arrangement described herein. In the exemplary instance considered, a query message 200 is sent from the host device 10 towards the card 12. The query message 200 prompts a command evaluation process 13 at the card level: this process leads, in step designated 15, to selection of given protocol within several protocols supported by the card 12. The query message 200 sent from the host 10 towards the card 12 may specify a given protocol proposed for interaction (say, a generic protocol Pi) and the command evaluation/protocol selection process in the card 12 aims at achieving set up of the card 12 according to the required protocol proposed by the host 10. A corresponding acknowledgement message 202 is then sent from the card 12 towards the host 10 which results in connection being established in step 204 between the host 10 and the card 12.

The arrangement just described herein (namely the host 10 indicating—i.e. "proposing"—one specific preferred protocol and the card 12 sensing the protocol preferred by the host 10) represents a currently preferred choice. This arrangement in fact permits—according to standard specifications—the selection by the host 10 of the protocol it prefers best and the ensuing configuration of the card 12 in conformity therewith.

In alternative embodiments of the arrangement described herein, the query message 200 issued by the host 10 may include the indication of a set of different protocols proposed for communication by the host 10. In that case, the command evaluation/protocol selection process prompted at the card level 12 aims at identifying at least one protocol supported by the card 12 and matching the set of protocols proposed by the host 10.

In the block diagram of FIG. 4, the reference 14 indicates a host bus acting as a communication link adapted to carry command, clock and data signals exchanged between the host 10 and the interface (card) 12.

The card 12 includes a set of memory controllers $16a$, $16b$, ..., $16n$ each storing the necessary information for supporting interaction with the host 10 by using a given protocol (such as e.g. SDIO, SD, MMC, and so on) over the bus 13. Such interaction takes place according to criteria that are well known to those of skill in the art, thus making it unnecessary to provide a more detailed description herein. Specifically, in the representation of FIG. 4, $C_i:P_j$ denotes the i-th controller supporting the j-th protocol in a given list.

The interface 12 additionally includes a protocol selector 18 driven by a command line $14a$ included in the host bus 14. Output from the protocol selector 12 is via a plurality of protocol configuration lines 20 each of which comes down to a respective one of the memory controllers $16a$, $16b$, ... $16n$. Consequently, when a given protocol enable signal is generated by the protocol selector 18 over one of the protocol configuration lines 20 a corresponding one of the memory controllers $16a$, $16b$, ... $16n$ is enabled and interaction between the host 10 and the interface 12 is activated using the corresponding protocol.

In the flow chart of FIG. 5, the block indicated 1002 designates a step wherein the host 10 sends towards the interface 12 the command generally designated 200 in the schematic representation of FIG. 3. As a result of this query signal, sent over the command line $14a$, the protocol selector 18 performs the command evaluation/protocol selection steps represented by the blocks 13 and 15 of FIG. 3. Specifically (by making reference to the flow chart of FIG. 5) the related processing involves a command recognition step 1004, followed by a step 1006 wherein a check is made as to whether the type of command sent is known to the interface 12: essentially this amounts to establishing whether the protocol or the protocols specified in the command 200 received during the step 1002 corresponds to one of the protocols supported one of the controllers 16*a*, 16*b*, . . . , 16*n* in the interface 12.

In the case command is not known, a corresponding signal is issued in the step 1008 towards host 10 and the process evolves towards a final stop condition.

If, conversely, the command is known (i.e., positive outcome of step 1006) in a subsequent step 1010 the protocol selector 18 proceeds by asserting a corresponding protocol. This step involves issuing on a respective one of the protocol configuration lines 20 a signal enabling the one memory controller in the set 16*a*, 16*b*, . . . , 16*n* which contains the information required for setting up the interface 12 for communication with the host 10 using the protocol selected.

Without prejudice to the underlying principles of the invention, the details and the embodiments may vary, also appreciably, with respect to what has been described, by way of example only, without departing from the scope of the invention as defined in the claims that follow.

We claim:

1. A method of automatically setting-up protocol-based communication between a host device and a dedicated external memory device, comprising:
   providing, in said dedicated external memory device a plurality of protocol-supporting facilities, each said facility adapted for supporting communication with said host device based on a respective protocol;
   sending from said host device towards said dedicated external memory device a message specifying at least one protocol for use in said protocol-based communication;
   searching, within said plurality of protocol-supporting facilities one protocol-supporting facility supporting said at least one protocol proposed in said message; and
   if such protocol-supporting facility is found in said plurality of protocol-supporting facilities, setting up said dedicated external memory device for protocol-based communication with said host based on said at least one protocol proposed in said message.

2. The method of claim 1, further comprising configuring said dedicated external memory device as a storage card.

3. The method of claim 1, further comprising configuring said dedicated external memory device as a flash device.

4. The method of any claim 1, further comprising providing said protocol-supporting facilities in the form of a plurality of memory controllers.

5. The method of claim 1, further comprising providing in said dedicated external memory device a protocol selection module sensitive to said command and configured for selectively activating said protocol-supporting facilities.

6. The method of claim 1, further comprising selecting said protocol-supporting facilities as facilities supporting SDIO, SD or MMC protocols.

7. A dedicated external memory device for automatically setting up protocol-based communication with a host device, the dedicated external memory device including:
   a plurality of protocol-supporting facilities, each said facility adapted for supporting communication with said host device based on a respective protocol;
   a communication link for receiving from said host device a message specifying at least one protocol for use in said protocol-based communication; and
   a protocol selector for searching, within said plurality of protocol-supporting facilities one protocol-supporting facility supporting said at least one protocol proposed in said message, whereby, if such protocol-supporting facility is found in said plurality of protocol-supporting facilities, said dedicated external memory device is adapted to be set up for protocol-based communication with said host based on said at least one protocol proposed in said message.

8. The dedicated external memory device of claim 7, wherein said dedicated external memory device is configured as a storage card.

9. The dedicated external memory device of claim 7, wherein said dedicated external memory device is configured as a flash device.

10. The dedicated external memory device claim 7, wherein said protocol-supporting facilities comprise a plurality of memory controllers.

11. The dedicated external memory device of claim 7, wherein said protocol selection module includes a set of protocol configuration lines for selectively activating said protocol-supporting facilities.

12. The dedicated external memory device claim 7, wherein said protocol-supporting facilities are configured for supporting SDIO, SD or MMC protocols.

13. A computer program product, loadable in the memory of at least one computer and including software code portions for performing a method of automatically setting-up protocol-based communication between a host device and a dedicated external memory device, the method comprising:
   providing, in said dedicated external memory device a plurality of protocol-supporting facilities, each said facility adapted for supporting communication with said host device based on a respective protocol;
   sending from said host device towards said dedicated external memory device a message specifying at least one protocol for use in said protocol-based communication;
   searching, within said plurality of protocol-supporting facilities one protocol-supporting facility supporting said at least one protocol proposed in said message; and
   if such protocol-supporting facility is found in said plurality of protocol-supporting facilities, setting up said dedicated external memory device for protocol-based communication with said host based on said at least one protocol proposed in said message.

14. The computer program product of claim 13, wherein the method further comprises selecting said protocol-supporting facilities as facilities supporting SDIO, SD or MMC protocols.

* * * * *